E. WILSON.
FIFTH-WHEEL.

No. 182,297. Patented Sept. 19, 1876.

Witnesses:
J. E. Lowner
D. J. Neff

Inventor:
Edwin Wilson

UNITED STATES PATENT OFFICE.

EDWIN WILSON, OF PRATTSBURG, NEW YORK.

IMPROVEMENT IN FIFTH-WHEELS.

Specification forming part of Letters Patent No. 182,297, dated September 19, 1876; application filed February 28, 1876.

*To all whom it may concern:*

Be it known that I, EDWIN WILSON, of Prattsburg, in the county of Steuben and State of New York, have invented a new and useful Improvement in Carriages, which improvement is fully set forth in the following specification, reference being had to the accompanying drawings.

Figure 1:
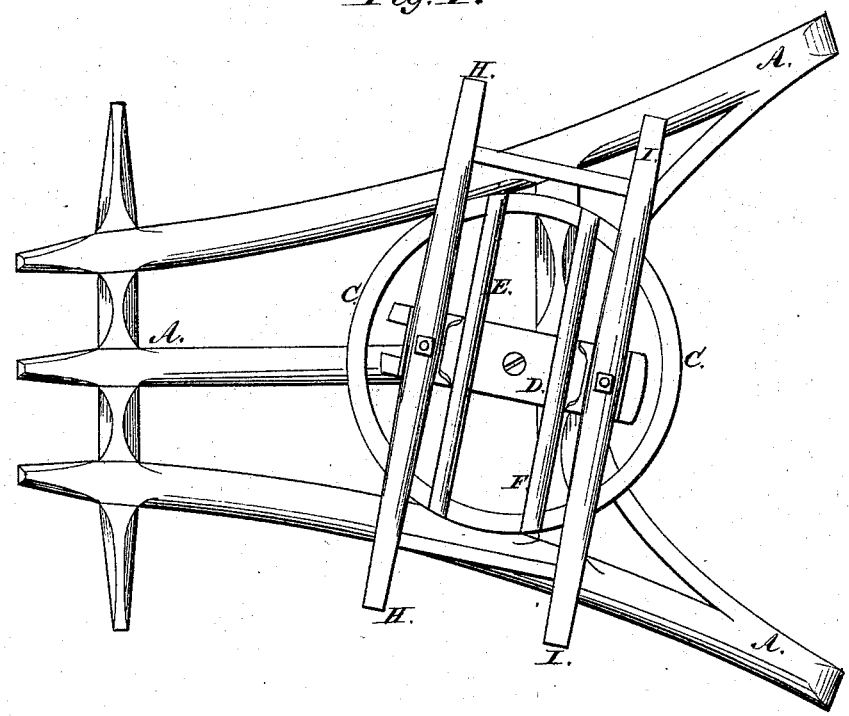

The object of my invention is to construct that part of a carriage supported by the forward axle in such manner that the parts will not be strained by running over an uneven road, the parts being so constructed and put together that the joints will yield to the unevenness of the road; and my invention more particularly belongs to that class of carriages that have what are generally denominated platform-springs, as shown in Fig. 1 of the accompanying drawings, in which—

Figure 2:
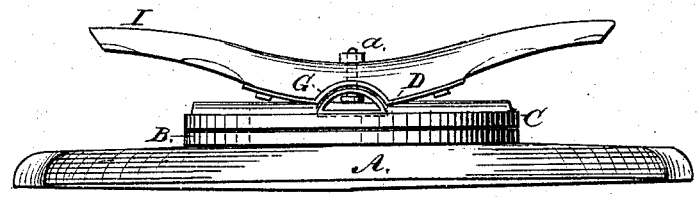

Figure 1 is a plan or top view, and Fig. 2 a side view, of a bolster and its support.

A is a frame-work that is placed upon the carriage-springs and fastened to them. It may be constructed in any ordinary manner. Upon its upper surface and nearly central portion the circle-plate B is fastened, and in the center of the circle-plate there is a plate of iron fastened to the frame A for the king-bolt to pass down through. This plate is made in any ordinary manner. Upon the upper surface another corresponding plate of iron is placed and held in position by the same king-bolt.

C is the top circle-plate. It is made the same size as the one upon which it rests and turns. It is provided with two cross-bars, E and F, that are securely fastened to it. These bars hold the plate in position, so that when the direction of the carriage is changed this plate will turn upon the one that supports it the same as in carriages of the ordinary construction.

D is a plate of iron, made to rest and turn upon a corresponding plate beneath it. The king-bolt passes down through them both and holds them in place. The position of this plate is shown in Fig. 1. To this plate the bars E and F are securely fastened, so that this plate and the circle C are all held firmly together, so that the parts of the carriage beneath the circle C may be turned in either direction without changing the circle and its connections with respect to the carriage-body.

G is one of the circular bolster-plates. There is one at each end of the plate D. They may be made with, or attached to, the plate D, as preferred, and are situated outside of the cross-bars E and F, and are under the bolsters H and I, (which are commonly called by carriage-makers, bolsters,) as represented in Fig. 1. They are made semi-cylindrical in form, as represented in Fig. 2. They have a slot made in their upper sections for the body of the bolt $a$ to slide in, which will allow the bolsters to be rocked upon them. These circular plates will allow the carriage to be driven over irregular surfaces without straining any of the parts or having the team drawing the carriage molested by the action of the neap, as in carriages constructed in the ordinary manner.

H and I are the bolsters. They are connected together by cross-bars, as shown in Fig. 1, and their shape is represented in Fig. 2. Their length should correspond with the width of the carriage-body, and upon the top of these bolsters the forward end of the body rests and is securely fastened. At the middle of each bolster is made a circulate place to fit the top of the circles C, as shown in Fig. 2. These places may be faced with iron to prevent wear. The bolsters are held on the circles C by bolts $a$, which are put up through the slot in the circles C, and through the bolsters leaving the head of the bolts within the circles C, as represented in Fig. 2.

Having thus fully described my invention, what I claim as new, and desire to secure by Letters Patent, is—

In the construction of carriages, the circle C attached to the plate D by the bars E and F, and the plate D provided with the semi-cylindrical plates G, made as specified, and having upon their upper surfaces the bolsters H and I, all constructed and arranged substantially as and for the purpose set forth.

EDWIN WILSON.

Witnesses:
J. E. TOWNER,
D. J. NEFF.